United States Patent [19]
Giles

[11] Patent Number: 5,633,741
[45] Date of Patent: May 27, 1997

[54] MULTICHANNEL OPTICAL FIBER COMMUNICATIONS

[75] Inventor: Clinton R. Giles, Morganville, N.J.

[73] Assignee: Lucent Technologies Inc., Murray Hill, N.J.

[21] Appl. No.: 393,616

[22] Filed: Feb. 23, 1995

[51] Int. Cl.$^6$ .......................... H04J 14/02; H04B 10/16; H01S 3/00

[52] U.S. Cl. .......................... 359/124; 359/110; 359/127; 359/179; 359/341

[58] Field of Search .................................. 359/124, 161, 359/174, 179, 110, 333, 341, 173, 127

[56] References Cited

U.S. PATENT DOCUMENTS

| | | | |
|---|---|---|---|
| 5,084,779 | 1/1992 | Stanley | 359/152 |
| 5,240,488 | 8/1993 | Chandross et al. | 65/3.11 |
| 5,327,516 | 7/1994 | Chraplyvy et al. | 385/123 |
| 5,365,368 | 11/1994 | Hsu et al. | 359/341 |
| 5,392,377 | 2/1995 | Auracher | 359/179 |
| 5,394,265 | 2/1995 | Nagel et al. | 359/341 |

OTHER PUBLICATIONS

K. Kannan and S. Frisken, "Unrepeatered Bidirectional Transmission System Over a Single Fiber Using Optical Fiber Amplifiers", *IEEE Photonics Tech. Lett.* vol. 5, No. 1, pp. 76–79, Jan. 1993.

C. Dragone, "Efficient N X N Star Couplers Using Fourier Optics", *J. Lightwave Tech.* vol. 7, No. 3, pp. 479–489, Mar. 1989.

Cheng et al, "622 Mb/s, 144 km Transmission Using a Bidirectional Fiber Amplifier Repeater", IEEE Photonics Technology Letters, vol. 5, No. 3, Mar. 1993, pp. 356–358.

Guo et al, "High–Speed Bidirectional Four–Channel Optical FDM–NSFSK Transmission Using an Er Doped Fiber Amplifier", IEEE Photonics Technology Letters, vol. 5, No. 2, Feb. 1993, pp. 232–235.

Maeda et al, "The Effect of Four–Wave Mixing in Fibers on Optical Frequency–Division Multiplexed Systems", Journal of Lightwave Technology, vol. 8, No. 9, Sep. 1990, pp. 1402–1408.

Morioka et al, "Multi–WDM–Channel, Gbit/s Pulse Generation from a Single Laser Source Utilizing LD–Pumped Supercontinum in Optical Fibers", IEEE Photonics Technology Letters, vol. 6, No. 3, Mar. 1994, pp. 365–368.

Orazi et al, "Bidirectional Transmission at 1.55 Microns Using Fused Fiber Narrow Channel Wavelength Division Multiplexors and Erbium–Doped Fiber Amplifiers", IEEE Photonics Technology Letters, vol. 6, No. 4, Apr. 1994, pp. 571–574.

Seikai et al, "Experimental Studies on Wavelength Division Bidirectional Optical Amplifiers Using an Er Doped Fiber", Journal of Lightwave Technology, vol. 12, No. 5, May 1994, pp. 849–854.

Li, "The impact of Optical Amplifiers on Long–Distance Lightwave Telecommunications", Proceedings of the IEEE, vol. 81, No. 11, Nov. 1993, pp. 1568–1579.

Barnard et al "Bidirectional Fiber Amplifiers", IEEE Photonics Technology Letters, vol. 4, No. 8, Aug. 1992, pp. 911–913.

*Primary Examiner*—Leo Boudreau
*Assistant Examiner*—Bhavesh Mehta
*Attorney, Agent, or Firm*—George S. Indig

[57] ABSTRACT

WDM optical fiber communications entails bidirectional transmission with at least two WDM channels in opposite transmission directions in a single fiber. As compared with unidirectional transmission, a number of capacity-limiting considerations are relaxed. Operation using in-ground dispersion-shifted fiber permits system capacities of conventional unidirectional WDM.

19 Claims, 9 Drawing Sheets

BIDIRECTIONAL 16-CHANNEL INTERLEAVING

21x21 ROUTER PORT UTILIZATION

MULTICHANNEL OPTICAL FIBER COMMUNICATIONS

TECHNICAL FIELD

Wavelength Division Multiplexed (WDM) optical fiber communications.

DESCRIPTION OF RELATED ART

Next generation optical fiber communications will use wavelength division multiplexing. There are plans for a model system with four channels, each operating at a digital bit rate of 2.5 g bits with sufficiently close channel-to-channel spacing so that the whole WDM set can be simultaneously amplified by an optical amplifier. Presently-used erbium-doped fiber amplifiers (EDFA) have amplification bandwidths of 12 nm, with those of recent production increased to 25 nm. WDM channel spacings of ~1 nm leave ample room for further capacity upgrading. Raman amplification is under study for supplementing 1550 nm EDFA operation to permit a separate set of WDM channels at a system wavelength of 1310 nm.

It was recently found that the prevalently-used dispersion-shifted fiber (DSF) severely limits WDM operation. The very dispersion-nulling, so important in minimizing capacity limitations due to chromatic dispersion, aggravates degradation due to four-wave mixing (4 WM), so that the power penalty resulting from channel- to-channel beating effectively precludes contemplated four-channel operation. The difficulty is overcome by introduction of the finite dispersion fiber of U.S. Pat. No. 5,327,516 issued Jul. 5, 1994. This fiber has sufficient dispersion to effectively avoid 4 WM, but insufficient dispersion to seriously limit bit rate. New systems offer full expected WDM capability by use of this fiber.

The problem of WDM-upgrading of already-installed single channel systems using DSF has also been addressed. The most promising approach uses channel wavelength allocation to avoid coincidence of 4 WM products with carriers of other channels. See, pending U.S. pat. app. Ser. No. 08/199,364, filed Feb. 18, 1994. The uneven spacing format is usefully applied to newly-installed systems which are 4 WM-limited.

While not the focus of near-term commercial activity, analog as well as digital systems are under consideration. "Fiber to the home", e.g. cable TV, is exemplary—WDM as enabled by optical amplification will likely play a role in analog transmission.

SUMMARY OF THE INVENTION

Properly applied, bidirectional transmission within a single optical fiber, offers relaxation of 4 WM-imparted limitations. Commercially produced bidirectional amplifiers should not be very much more complex or costly than unidirectional amplifiers.

The immediate implication is in upgrading of in-ground systems to permit WDM capacity in DSF or other fiber design of insufficient dispersion to permit desired WDM operation.

The multichannel bidirectional transmission of the invention offers capacity advantages for future systems. It may supplement use of the various forms of WDM-capable systems with a corresponding increasing capacity. Inventive embodiments include use with uneven as well as even channel spacing; with finite dispersion fiber as well as DSF.

A variety of preferred embodiments are described. Some optimize operation with prescribed channel positioning, e.g., with interleaved forward and backward channels for maximizing channel-to-channel spacing within a given amplifier bandwidth budget.

Terminology

WDM—Refers to closely-spaced channels—e.g. with channel-to-channel spacing ≦5 nm—to enable simultaneous amplification by a single optical amplifier. Whereas the term, as applied to usual systems, contemplates four or more unidirectional channels, it is here used to refer to bidirectional systems with as few as two channels in each direction.

Channel—The term is used to describe channels of a WDM set—channels which together have a spectral width that may be accommodated within the amplification band of an optical amplifier in the circuit.

2+2, 4+4, etc.—The number of forward and backward channels on a single fiber. (Operation of the claimed systems invariably depends upon at least one bidirectional fiber, although unidirectional fibers may also be included).

Dispersion—Chromatic dispersion, considered as primarily due to the linear effects of material dispersion and waveguide dispersion. For purposes of description here, self-phase modulation, certainly a factor of concern in overall system design, is not considered. Similarly, the sign of the dispersion is not of general concern, except for dispersion compensation.

Finite Dispersion Fiber—Fiber with dispersion in the range of from 1.5 ps/nm-km to 4 ps/nm-km at the system wavelength. The terminology includes, but is not limited to, the fiber of U.S. Pat. No. 5,327,516.

Minimal Dispersion Fiber—Fiber with dispersion below the range of finite dispersion fiber. The terminology includes DSF as well as state-of-the-art submarine fiber.

Span—Fiber distance between optical amplifiers, or in the instance of distributed Raman amplification, between pump injecting points.

Repeater Span—Fiber distance between optical-to-electrical or electrical-to-optical conversion. For the "model system" considered, there are three 120 km spans in a repeater span.

System Wavelength—The nominal wavelength of operation included within the WDM spectrum (and in turn, within the amplification spectrum of an optical amplifier). State-of-the-art long distance systems operate at a system wavelength of 1550 nm. Contemplated systems may include operation in the nominal 1310 nm "window" of silica fiber.

Model System—Four-channel WDM, 2.5 Gb/s per-channel system with one or more 360 km repeater spans, in turn, divided into three spans. The term is used for the primary intention of facilitating description. It is not intended as limiting claims or system capability. Under some circumstances, contemplated spans are smaller or larger—90 km or less up to hundreds of kilometers. Significantly higher bit rates are permitted.

DETAILED DESCRIPTION

General—The inventive advance logically divides into two categories.

Category I—Using at least one bidirectionally-transmitting fiber with two channels in at least one direction. A preferred Category I system uses one or more 2+2 fibers, in that it permits operation at a capacity conventionally thought to be prohibited by 4 WM. In this sense, it replaces the 4-channel unidirectional WDM system, likely to represent initial WDM usage.

Use of but two channels in each direction completely avoids the WDM degradation that has given so much recent concern. Avoidance of additional channels precludes any 4 WM product of a channel pair coinciding with a channel carrier. (There does remain a slight impairment since the two channels produce 4 WM products which, in themselves, carry a small power penalty. In further discussion, Category I systems and operation are described as "avoiding" 4 WM degradation.)

Here, the advance is likely to take the form of upgrading of already installed systems. Category I systems, exemplified by DSF, include substantial fiber span lengths of dispersion less than 1.5 ps/nm-km at the system wavelength—likely 1550 nm. Sate-of-the-art single-channel underwater systems use a fiber of a dispersion of approximately 1.2 ps/nm-km. Such underwater systems are candidates for upgrading.

In principle, the thrust of the Category I concept is applicable to operation with a 2+1 fiber since the equivalent 3-channel unidirectional fiber may suffer some 4 WM impairment. Expectation of equal traffic in both directions, at least for voice communications, would place a preference on 2+2.

Category II—Qualifying Category II systems and operations require bidirectional transmission in at least one fiber having a dispersion of from 1.5 ps/nm-km to 4 ps/nm-km at a WDM system wavelength. Such fiber, in 1550 nm systems exemplified by that of U.S. Pat. No. 5,240,488 issued Aug. 31, 1993, enables unidirectional model system operation for uniformly-spaced channels. Dispersion in such fiber is generally sufficiently low as to permit replacement for DSF. As in the patent, dispersion may be further reduced by terminal compensation. Even as upgraded by proper, uneven spacing, channel allocation, systems using this fiber continue to be 4 WM-limited. Number of channels and/or per-channel bit rates, may exceed the unidirectional limit.

In general, Category II systems in operation will concern systems yet to be installed. It is expected that they will contain one or more fibers each providing for at least 4-channel transmission in each direction. Interleaving is of greater consequence in Category II systems—permitting greater channel-to-channel spacing in each of the transmission directions.

Planned systems which may benefit by bidirectional transmission to exceed unidirectional 4 WM limitation may use features which which are not included in planned systems. They may operate in the 1550 nm window and use EDFAs: they may use Raman amplification, and operate in the 1310 nm transparency region.

Other Aspects

Brillouin backscattering and other considerations restricting spacing of oppositely-directed channels are minor. Channel interleaving is useful in all bidirectional systems. It is of particular value in lessening 4 WM limitations in systems having 3 or more channels in each of the transmission directions.

The convenience of bidirectional operation on the same fiber is retained. See, *IEEE Photon. Tech. Lett.*, vol. 5, no. 1, pp. 76–79 (1993). For the inventive systems in which the return path is on the same fiber, time for locating a malfunction may be shortened, resulting in reduction in downtime.

Relative freedom from degradation due to 4 WM is available in any bidirectional system. For any given number of total per-fiber channels, bidirectional operation permits greater channel-to-channel spacing. This is true regardless of channel allocation (with or without channel interleaving), since Brillouin backscattering, and other considerations limiting oppositely-directed channels, are less constraining than 4 WM for adjacent unidirectional channels.

Other operational requirements are generally not impaired—may be expedited. Specific circuit arrangements for add/drop, for multiplexing/demultiplexing, optical time domain reflectometry (OTDR), and generally for signal routing are described. A contemplated use of OTDR is for signaling substitution of a span responsive to an OTDR-detected fault.

Closely-spaced WDM systems are of particular value in permitting simultaneous amplification of an entire channel set, so that incorporation of one or more optical amplifiers in the inventive systems is contemplated. The inventive concept is usefully applied to unamplified systems as well, e.g., to underwater systems for island-hopping. It may be applied to local networks, fed by long-distance WDM, in which WDM demultiplexing is carded out at the end of the local line.

System Design—In many respects, bidirectionality requires little system modification. Important in upgrading, the main requirement is substitution of bidirectional amplifiers for the conventional amplifiers already in place. Multiplexing and demultiplexing equipment must be designed to accommodate bidirectional transmission.

Figure 1:
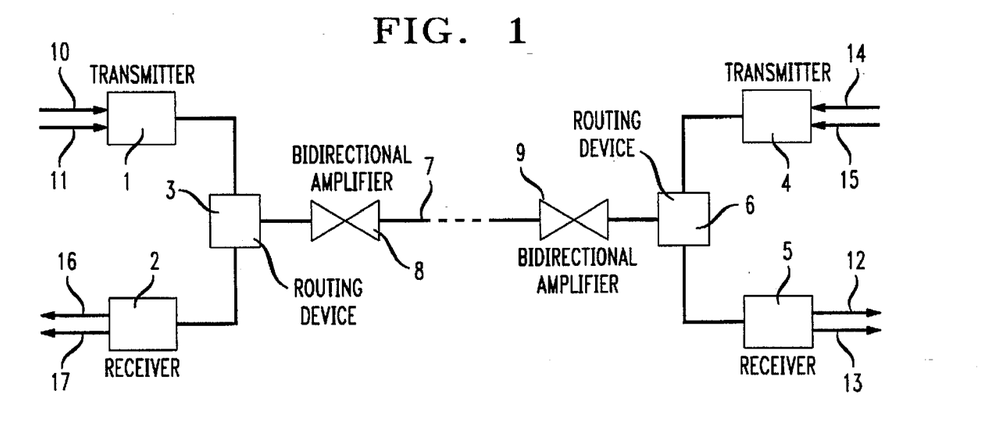
FIG. 1 is a schematic of a bidirectional fiber operating with 2 channels in each direction (2+2). The circuit may constitute an entire single fiber system or a subsystem, operating together with one or more additional fibers.

FIG. 1 is a schematic of a portion of a bidirectional system using a single 2+2 fiber. The system portion shown includes a first terminal constituted of transmitter 1, receiver 2, and routing device 3. It communicates with a second terminal constituted of transmitter 4, receiver 5 and routing device 6. Communication is by a single-fiber transmission line 7 served by bidirectional amplifiers 8 and 9. Transmitters and receivers include appropriate means for multiplexing and demultiplexing, with input to transmitter 1 consists of first and second WDM channels on fibers 10 and 11. Incoming oppositely-directed channels are introduced to transmitter 4 on fibers 14 and 15. Paired forward channels leave receiver 5 on fibers 12 and 13; paired counter channels leave receiver 2 on fibers 16 and 17.

Figure 2:
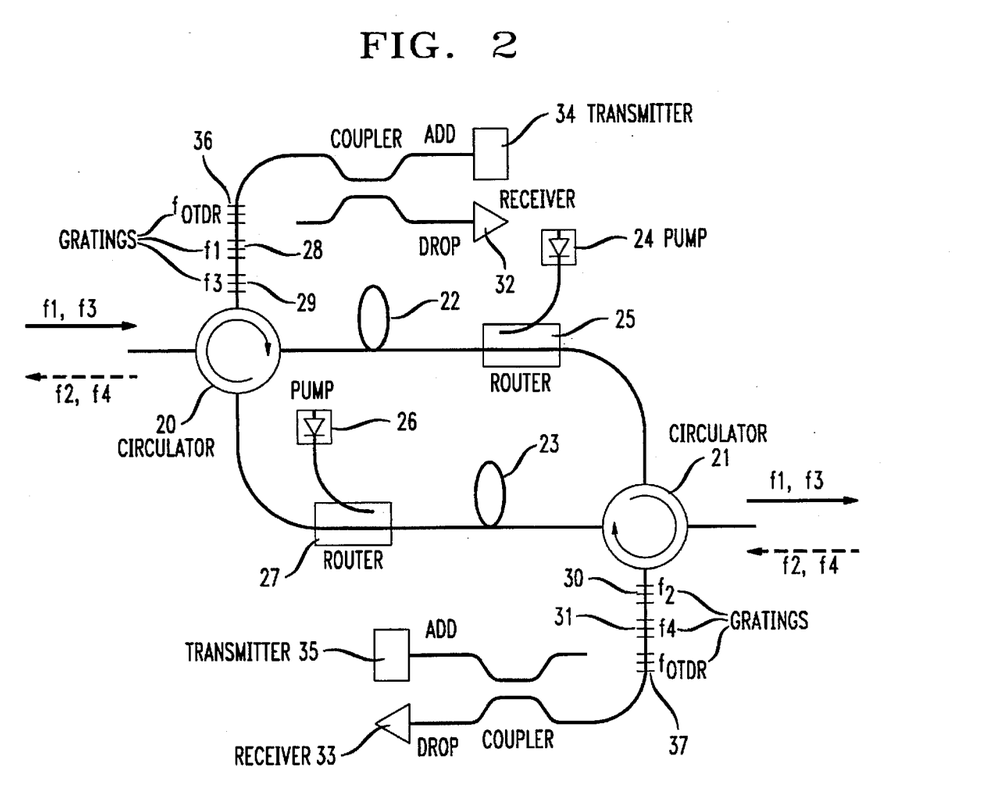
FIG. 2 is a detailed view showing one form of bidirectional amplifier which may be used with the system of FIG. 1.

FIG. 2 shows one form of bidirectional amplifier. It uses two 4-port optical circulators 20 and 21 to divert the two traffic directions into amplifying fibers 22 and 23, serviced by pumps 24, 26 and routers 25, 27. The system depicted provides for four-channel operation. Channels f1, f2, f3, f4 are shown as interleaved, with f1 and f3 propagating in one direction, and f2 and f4 propagating in the other direction. For claim purposes, this interleaved arrangement is described in terms of "channel transmission direction which changes at least twice in the ascending order of channel wavelengths". Interleaved channels, while occupying the same total bandwidth, increase spacing between pair members, and eases optical filtering requirements as well as multiplexing/demultiplexing. Since the 2+2 system shown avoids 4 WM degradation, channel-to-channel spacing may be uniform.

Fiber gratings 28, 29, 30, 31 serve as filters and stabilize against oscillation due to reflections and to Rayleigh back scattering. Add/drop circuitry, includes receivers 32 and 33 and transmitters 34 and 35. Transmitter-receiver pairs are joined through 3 dB couplers. The use of low reflectivity gratings 36 and 37 enables OTDR function while preventing amplifier oscillation at the OTDR wavelength within the gain region of the amplifier.

Figure 3:
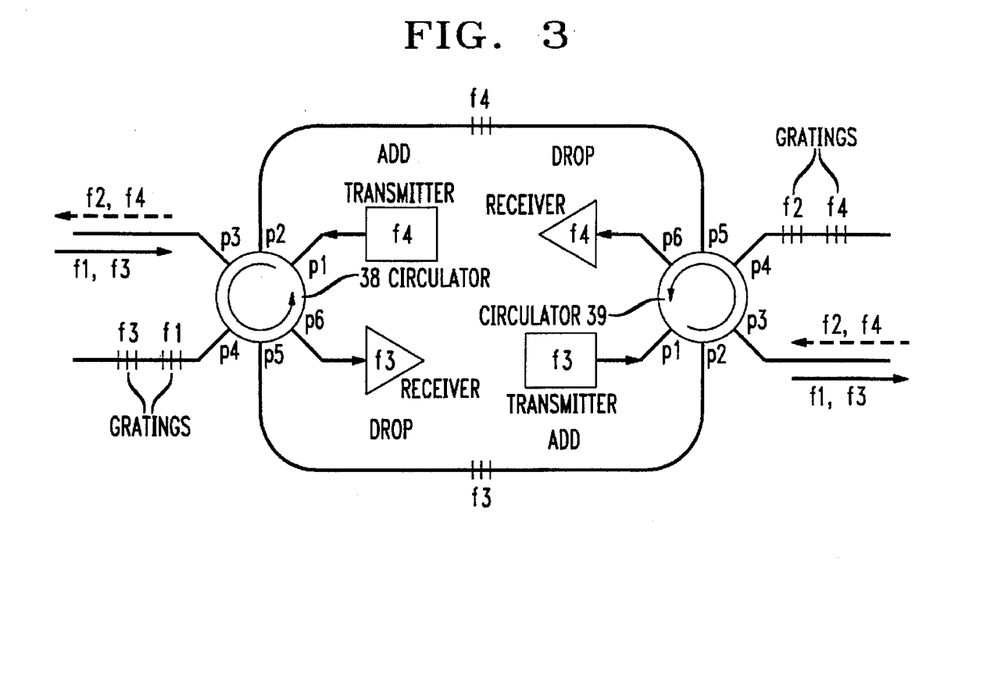
FIG. 3 is a circuit diagram showing a bidirectional add/drop multiplexer using optical circulators and fiber grating filters.

Add/drop multiplexers, for removing and replacing WDM channels, may be embedded within an optical amplifier or may be discrete passive elements. The FIG. 3 circuit uses two 6-port circulators 38 and 39 for optical filtering and suppression of channel backscattering. The system, 2+2, has forward transmission channels f1 and f3, and counter-direction channels f2 and f4. Add/drop multiplexing is carried out on channels f3 and f4. In operation after dropping f3: the signal arrives at port p3 of circulator 38; circulates to and is reflected back to port p4; circulates to port p5; and is reflected a second time to circulate and drop at port p6. The through-channel f1 does not experience the second reflection, and enters circulator 39 in which it circulates from port p2 and exits at port p3. As now newly modulated, f3 is introduced through port p1 of circulator 39, is reflected back to port p2, and exits through port p3 with f1. Identical add/drop function is obtained for channel f4 traveling in the opposite direction. Add/drop filters are shown as gratings and are identified in accordance with their pass frequencies. Add/drop filters shown connected to circulator ports 2 and 5 of both circulators may be optically switched to select add/drop channel. OTDR gratings may be added to ports p4 of both circulators as in FIG. 2.

Figure 4:
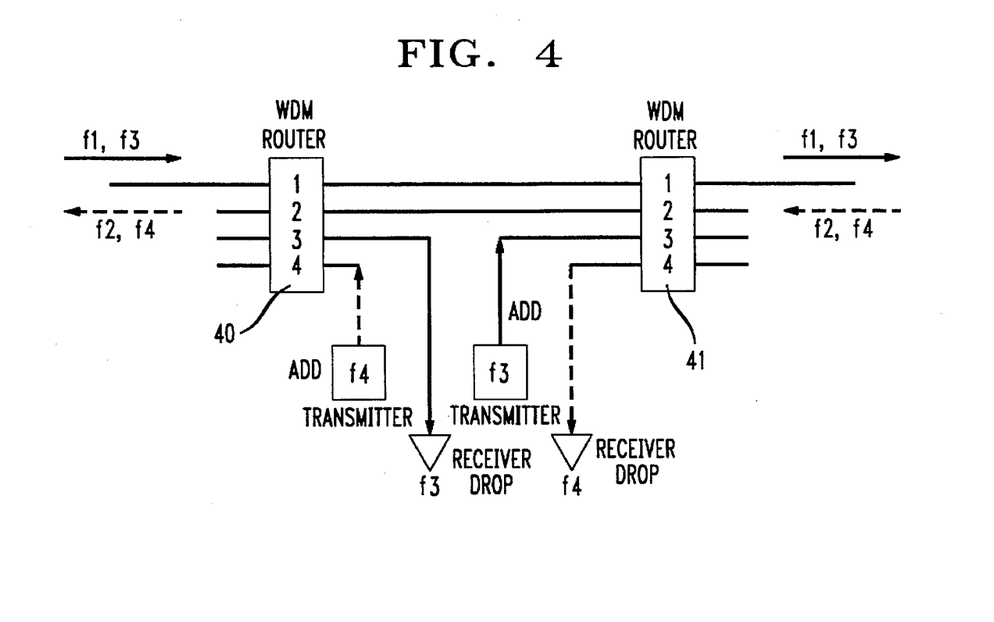
FIG. 4 is a circuit alternative to that of FIG. 3 constructed from WDM routers rather than circulators.

In FIG. 4, WDM router pair 40-41 is used for bidirectional add/drop multiplexing to add/drop channel 2 and 3 traffic flowing in both directions.

Figure 5:
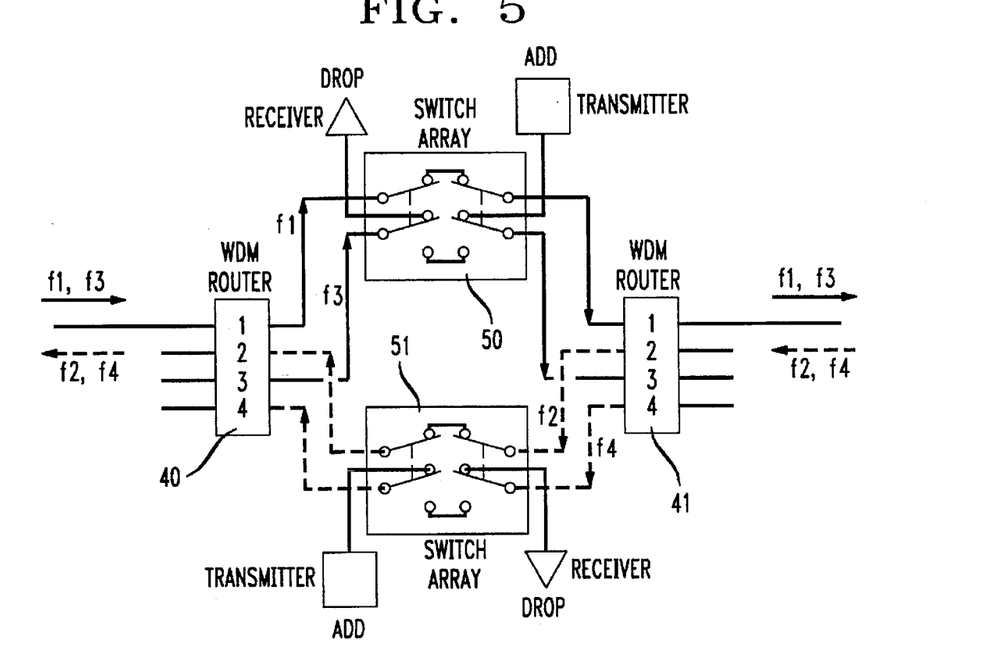
FIG. 5 is another circuit with the add/drop capability of FIGS. 3 and 4.

The add/drop function may be made tunable by embedding the wavelength routers in optical switch arrays, or by embedding switch arrays between the wavelength routers. The second arrangement is used in FIG. 5. As shown, either of the f1 or f3 channels may be added or dropped by use of switch array 50. Either of channels f2 or f4 of opposing traffic may be added or dropped by use of switch array 51. No isolation is obtained from these add/drop multiplexers and must be provided for separately. An additional wavelength is required to enable OTDR testing.

Figure 6:
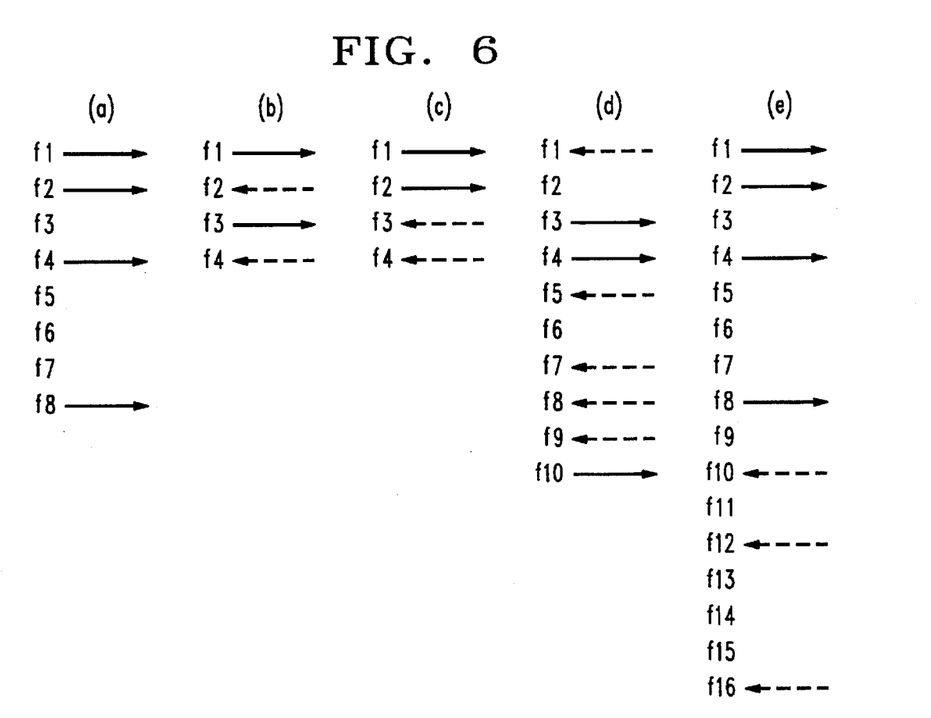
FIG. 6 is a table showing various channel allocation plans.

FIG. 6 compares channel allocations for four channel and eight channel, unidirectional and bidirectional WDM systems, The hypothetical sets from which columns a, d and e are constructed assume a set of evenly-spaced channels with minimal spacing determined by WDM degradation, optical filter capability and best bandwidth utilization. In these instances, 4 WM degradation is suppressed by channel omission (e.g. in column (a) by omission of channels f3, f5, f6 and f7) to avoid coincidence of 4 WM products with retained channels.

An advantage of Category I systems is shown in the first 3 columns. 4-channel unidirectional transmission (column (a)) is compared with two forms of 2+2—interleaved (column (b)) and separate band (column (c)). Relative freedom from 4 WM degradation for unidirectional transmission requires 50% channel usage. (Assuming minimal dispersion fiber, uneven channel spacing is required for operation in the model system.) The same capacity and greater is attained by operation with either of the 2+2 arrangements of columns (b) and (c). The interleaved system of column (b) has greater channel-to-channel spacing and facilitates filtering (as well as slightly reducing power loss due to 4 WM generation). The column (c) system continues to be a viable alternative, and may be the choice where system design or equipment makes interleaving impractical.

Columns (d) and (e) show two possible channel allocation plans for eight-channel bidirectional transmission. The case of eight-channel unidirectional transmission is not shown—fewer than 20% of channel slots are occupied for unidirectional transmission. Freedom from 4 WM degradation is assured by combining forward and reverse direction versions of the unidirectional plan of column (a). In column (d), the channels are interleaved to result in only two idle slot positions −80% slot utilization relative to the 20% for unidirectional transmission. One or both idle slots in column (d) may be used, e.g., for OTDR. The plan of column (e) does not interleave but separates the WDM sets for the two propagation directions. It may be modified to provide a guard band larger than the channel-to-channel spacing; $\Delta f$, between the two bands (between f8 and f9). The column (e) allocation plan utilizes 50% of available channel slots.

The TABLE summarizes characteristics for four multichannel systems in which channels are omitted from evenly-spaced sets to avoid 4 WM degradation. Unidirectional, bidirectional with separated bands, and bidirectional with interleaved bands are compared. Criteria listed are: "BW"—total bandwidth for the evenly-spaced set; "Eff"—utilization of available channel slots in percentage; and "Router"—the router size required for unique routing to a specific port.

TABLE

| | No. Channels | | | |
|---|---|---|---|---|
| | 4 | 8 | 16 | 32 |
| Unidirectional | | | | |
| BW | 8 | 45 | 252 | 1523 |
| Eff. | 50% | 17.8% | 6.4% | 2.1% |
| Router | 5 × 5 | 21 × 21 | 47 × 47 | 134 × 134 |
| Bidirectional: Separated | | | | |
| BW | 4 | 16 | 90 | 504 |
| Eff. | 100% | 50% | 17.8% | 6.4% |
| Router | 2 × 2 | 5 × 5 | 21 × 21 | 47 × 47 |
| Bidirectional: Interleaved | | | | |
| BW | 4 | 10 | 46 | 253 |
| Eff. | 100% | 80% | 34.8% | 12.6% |
| Router | 2 × 2 | 5 × 5 | 21 × 21 | 47 × 47 |

Reduction in required router size for bidirectional transmission is appreciable. For example, the 32-channel unidirectional system requires a 134×134 router—a size considered by many to be beyond the state-of-the-art. For bidirectional systems, the required router is 47×47.

Figure 7:
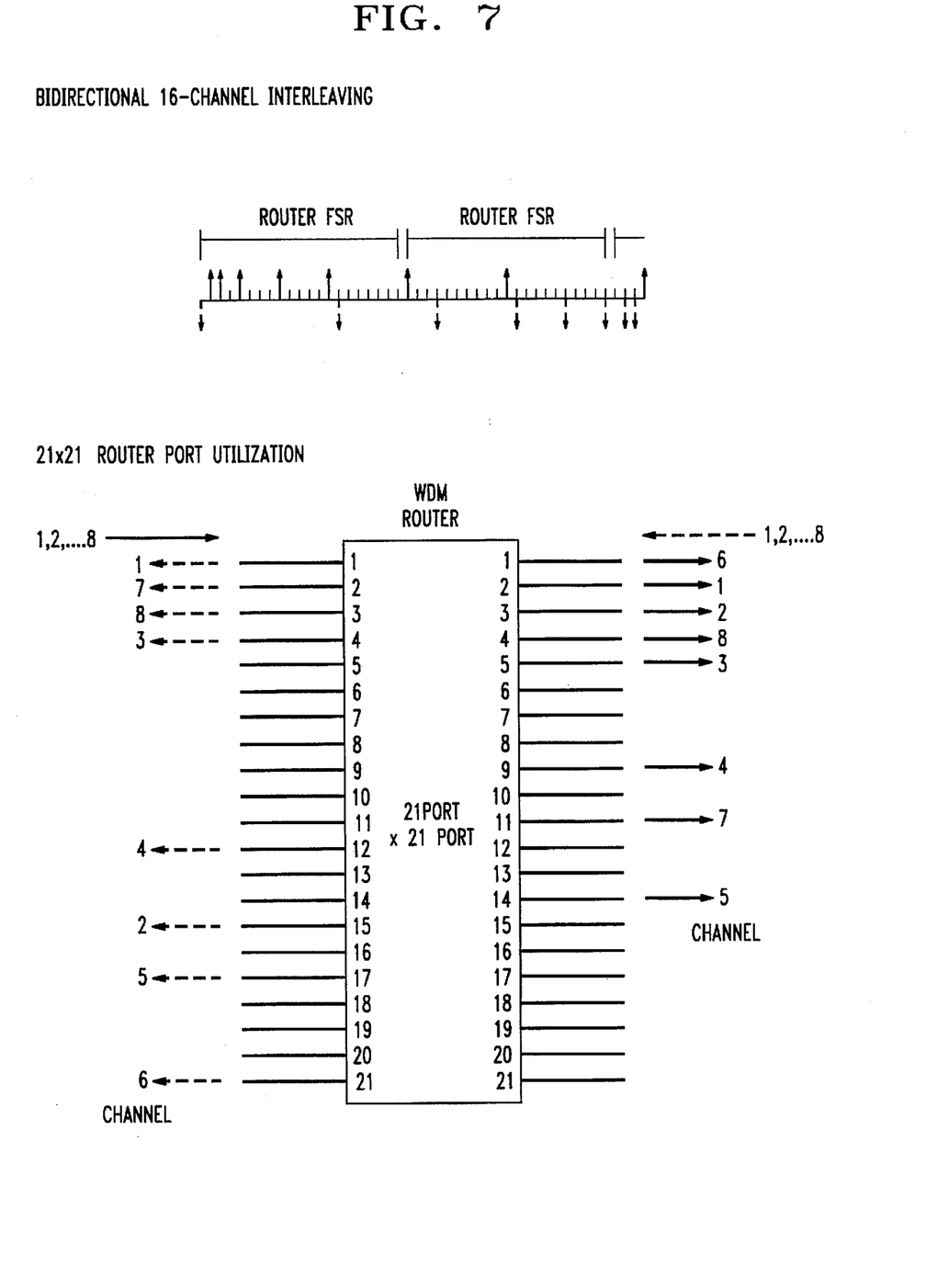
FIG. 7 is a diagram showing an illustrative interleaved channel allocation and router port utilization for a 16-channel bidirectional system.

FIG. 7 shows routing arrangement for a 16-channel bidirectional system using a 21×21 router. A state-of-the-art 21×21 router requires a 9.4 nm spectral range. A favored design, the "Dragone" router, named after its inventor, is described in *J. Lightwave Tech.* vol. 7, no. 3, pp. 479–489 (1989).

Figure 8:
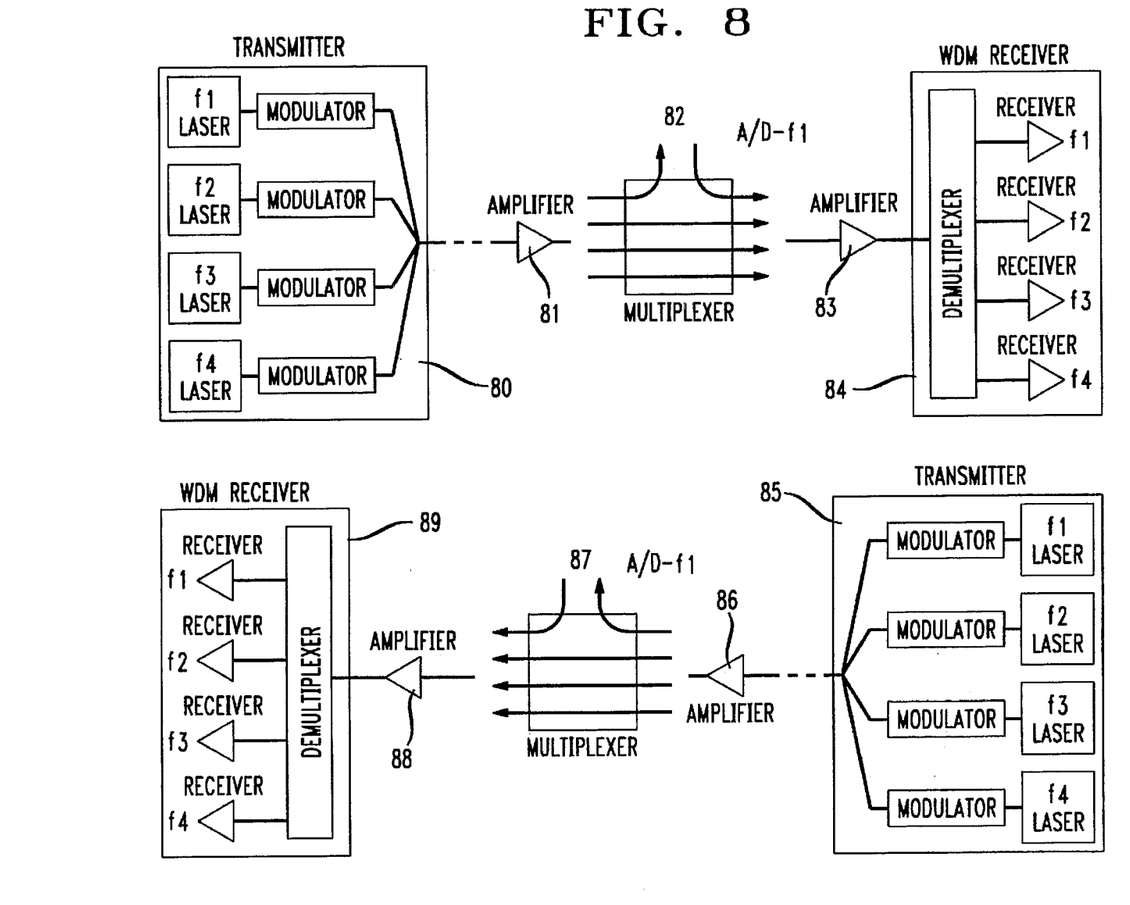
FIG. 8 is a circuit diagram of a two-fiber, 8-channel, unidirectional system.

FIG. 8 shows a conventional two-line, four-channel per-fiber system. It is properly regarded as two independent single fiber systems. The first consists of transmitter 80, introducing its associated WDM set through amplifier 81, add/drop multiplexer 82, amplifier 83 and to WDM receiver 84. The second, a mirror image of the first, consists of transmitter 85, amplifier 86, add/drop multiplexer 87, amplifier 88 and WDM receiver 89. Two add/drop multiplexers are required. Each operates on channel f1, leaving f2, f3 and f4 for express traffic. Designs for switching the add/drop function to different channels are known, and would be required for both lines. Failure of either transmission line compromises the system.

Figure 9:
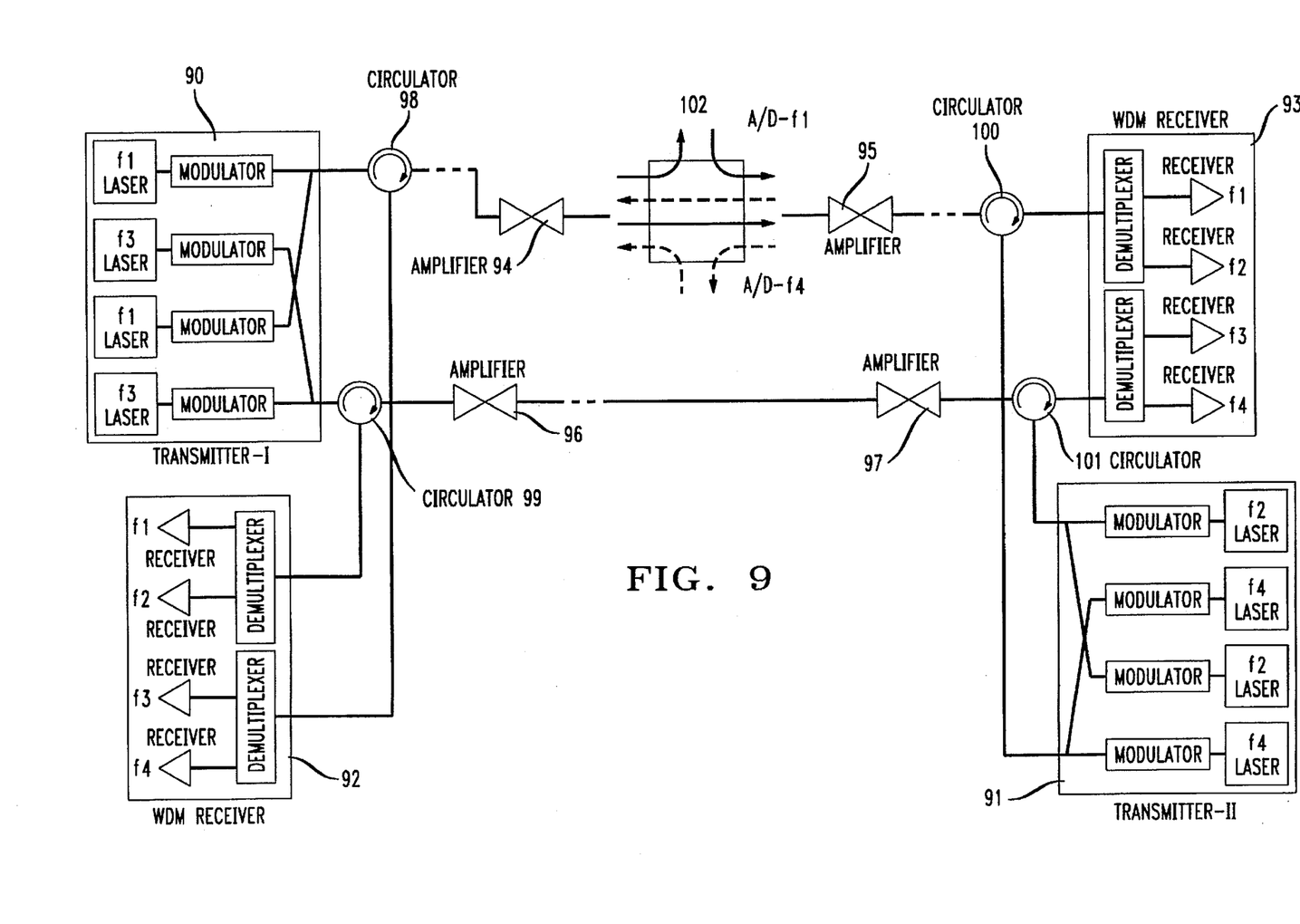
FIG. 9 is a circuit diagram of a 2-fiber, 8-channel bidirectional system.

FIG. 9 shows a corresponding bidirectional network. Each of transmitters 90, 91 and WDM receivers 92, 93 services the entire four channels as in FIG. 8. Amplifiers 94, 95, 96 and 97 are now bidirectional, possibly of the design of FIG. 2. Routing functions, e.g., for separating incoming from outgoing signals, are performed by circulators 98, 99, 100, 101. Only a single add/drop multiplexer 102 is required. In the example shown, channel f1 of one direction, and channel f4 of the opposite direction, are added/dropped. The entire span of the second line is dedicated to express traffic. There is some inherent protection for express traffic, and this is maximized where the two lines are not physically contiguous.

Bidirectional transmission offers design flexibility in that duplex transmission for any "conversation" can be provided in one single line.

Bidirectional transmission halves the number of channels propagating in one fiber in a given direction. Although all channels in a fiber must still be assigned unique wavelengths due to reflection and backscattering impairments, transmitter and receiver design may be simplified. For example, only two source wavelengths are required at each transmitter, rather than four for the unidirectional design. While each transmitter is shown as including four separate lasers, two shared lasers may be adequate. By interleaving the channel wavelengths for the two propagation directions, channel spacing, and therefore filter spacing at the receiver, can be doubled. This may significantly relax filter specifications while avoiding 4 WM impairment (for the 2+2 fibers shown).

Transmitter 90 is configured to allow channel rerouting through the add/drop multiplexer by turning the appropriate laser on or off. With upper laser f1 and lower laser f2 turned on, signals from the top modulator constitute local traffic at the add/drop multiplexers. With the corresponding f1 and f3 lasers of transmitter 91 turned on, the third modulator signals constitute the local traffic. This method of switching traffic at the add/drop multiplexer, does not require switching high speed electric signals. Since it does switch wavelengths of traffic on the express line, the receivers would have to be properly informed. As shown, transmitter 91 requires switching electrical signals to effect the same traffic rerouting. As with the unidirectional network of FIG. 8, a tunable add/drop multiplexer may be substituted.

The following example compares 4-channel communications for the unidirectional and bidirectional cases. The text, in addition to the specifics, makes generalizations and constitutes a significant part of the detailed description.

EXAMPLE

Two separate experiments were conducted. The same transmission line and other equipment were used for both, where possible.

The nominal system wavelength was 1550 nm. It used four lasers for generating channels at: f1=1554.0 nm; f2=1554.8 nm; f3=1555.6 nm; and f4=1556.4 nm. Them were three InCaAsP distributed feedback lasers (DFB), and one tunable external-cavity laser. (No particular purpose was served by the tunable laser—there simply were not enough DFBs available to the experimenter.) In bidirectional transmission, sources were combined through interleaved pairs of 3-dB couplers, f1–f3 and f2–f4. Channel pairs were externally modulated through LiNbO$_3$ Mach Zhender modulators. Modulation rate was 2.5 Gb/s with a $2^{23}-1$ pseudo-random bit stream ("PR" with repeating passages of the indicated length). This ensured a degree of channel-to-channel decorrelation approximating real conditions.

The fiber span length was 100 km and consisted of DSF with an average loss of 0.22 dB/km, an effective core area of 50 µm$^2$ and was dispersion-nulled at 1551.8 nm. EDFAs boosted the per-channel power to 8 dBm.

A two-channel demultiplexer and a bidirectional transceiver terminal used 3-port optical circulators and bandpass fiber gratings. The fiber gratings had 100% reflectivity at the channel wavelengths (to render the circulator-gratings assemblage transmitting), 0.8 nm –3 dB bandwidths and >30 db adjacent channel rejection. Reflected- and Rayleigh-scattered light from the local transmitters were prevented from reaching the local receiver by 1554.0 nm and 1555.6 nm fiber-grating locking filters between the transceiver circulator and the demultiplexer. Insertion loss for the demultiplexer was 2.9 db to the 1554.8 nm port and 1.8 dB to the 1556.4 nm port. Loss through the transceiver circulator from the transmitter to the fiber was 1.1 dB. Loss through the transceiver circulator from the fiber through the locking gratings were 2.0 dB.

Figure 10:
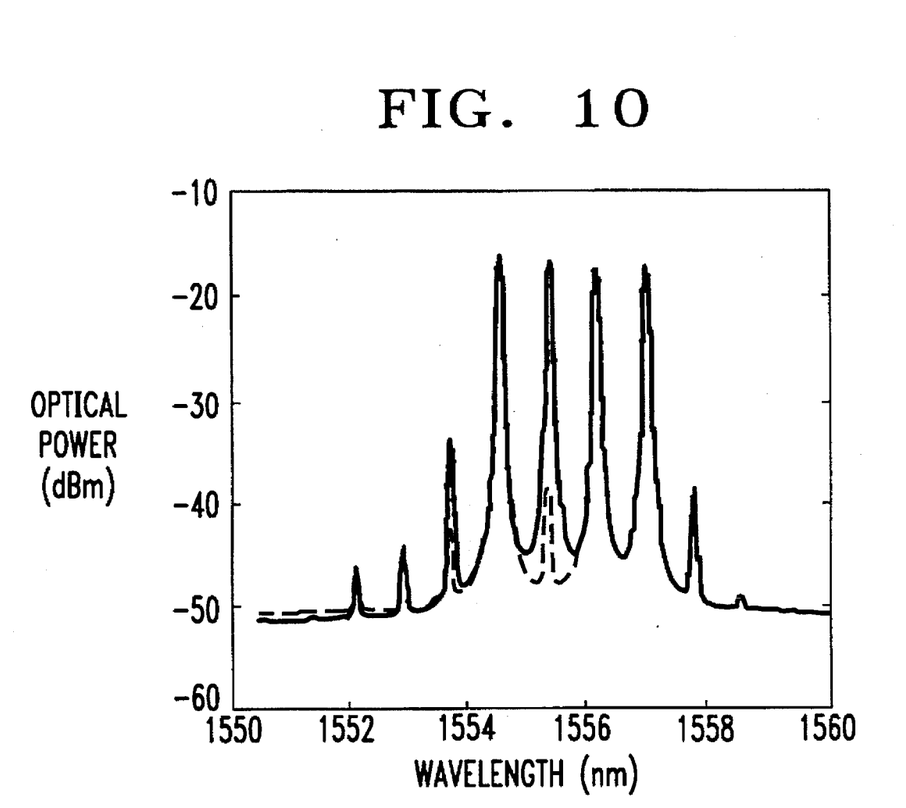
FIGS. 10, 11, 12, 13 and 14 are graphs plotting relative signal deterioration for unidirectional and bidirectional transmission in the Example.
Figure 11:
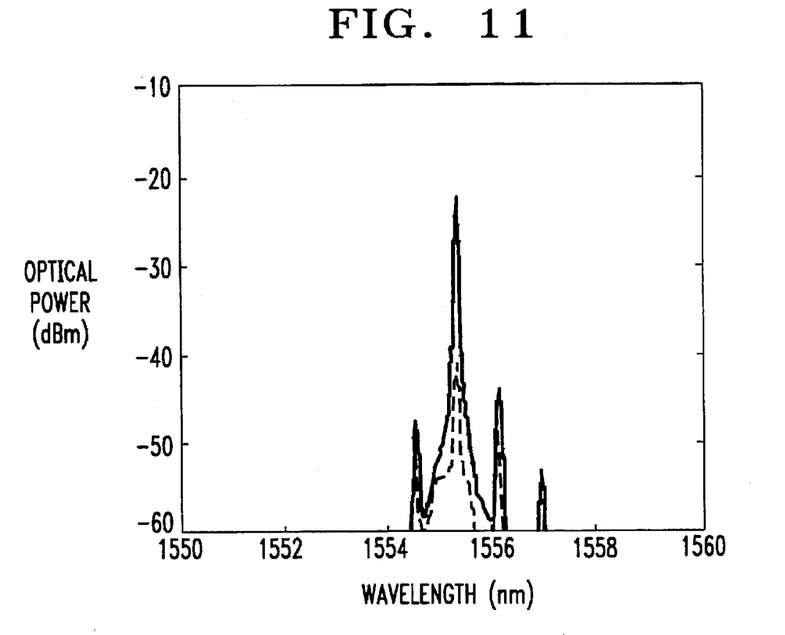
Figure 12:
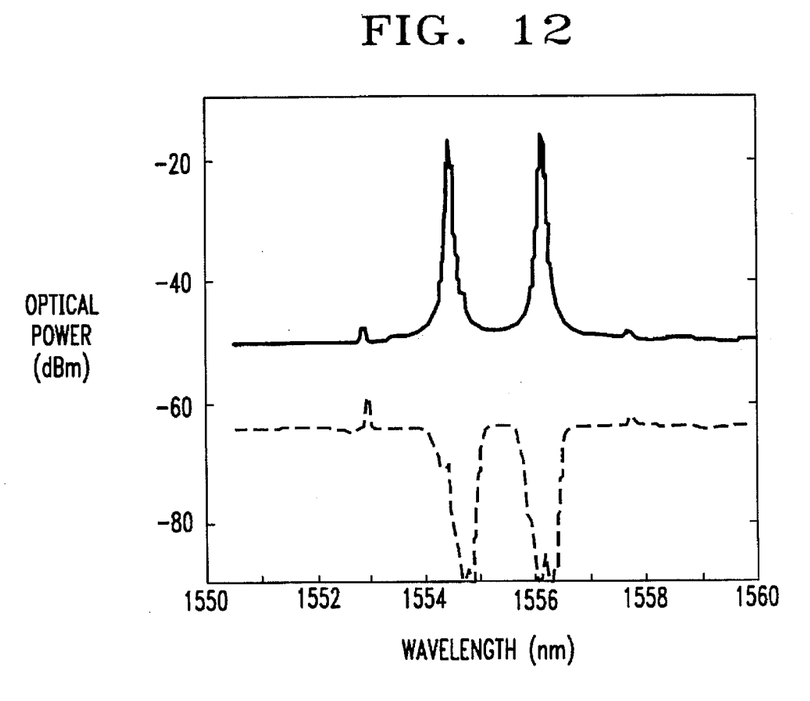
Figure 13:
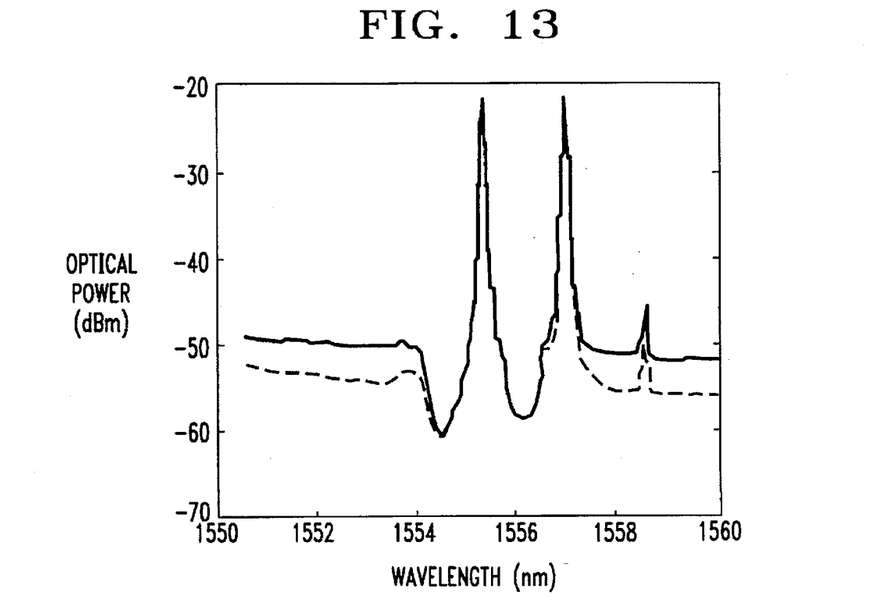
Figure 14:
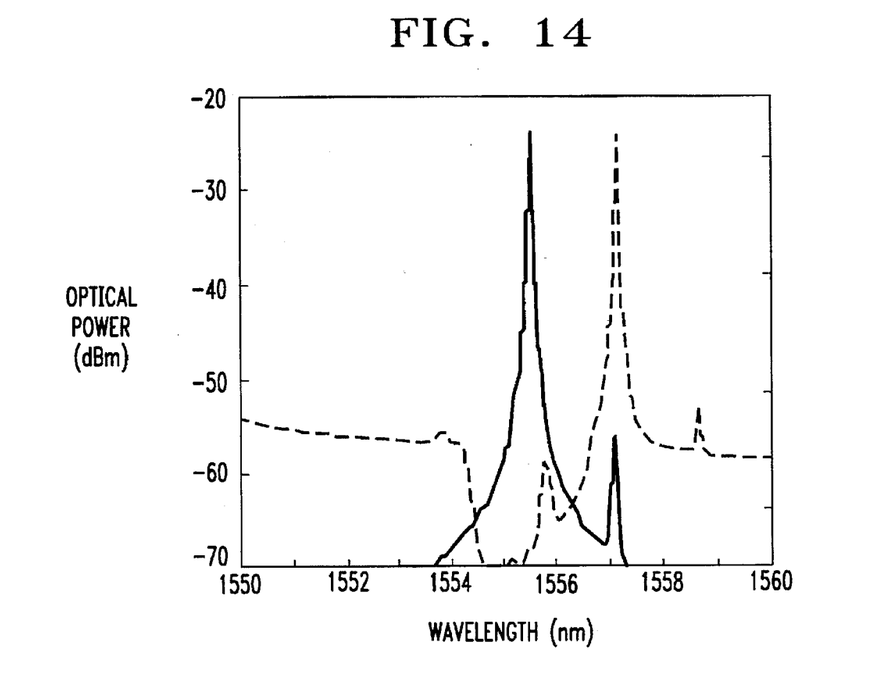

Results are shown graphically—unidirectional transmission on FIGS. 10, 11, and bidirectional transmission on FIGS. 12, 13, 14. All figures are on coordinates of optical power in dBm and wavelength in nm.

Results plotted on FIG. 10 show the optical spectra after 100 km transmission. The power penalty for the second channel (1554.8 nm) was measured by turning off that channel, thereby leaving only the interfering 4 WM product/s in that slot position. Measurement with all channels on is in solid; measurement with the second channel off is shown on the dashed line. There is some reduction in the number of 4 WM products when going from four to three channels (when turning off the second channel)—this is apparent by comparison of the curves for the regions outside of the channel wavelengths. FIG. 11 is a plot of the spectra at the 1554.8 nm port of the demultiplexer, again with and without the 1554.8 nm channel turned on. Degradation is severe.

Referring now to results for bidirectional transmission, FIG. 12 shows spectra with and without the 1554.8 nm channel turned off. The upper curve shows the forward direction 1554.0 nm and 1555.6 nm channels after 100 km transmission. Only two weak 4 WM products are visible. The channel blocking filters pass only signals outside of the channel wavelengths, 4 WM and Rayleigh backscattering products. The lower spectrum in FIG. 12 is for plotted from a measurement at that position.

FIG. 13 shows the spectra after the blocking filters, but with the 1554.8 nm and 1556.4 nm channels turned on. The solid line spectrum was measured with the 1554.0 nm and 1555.6 nm channels turned off; the dash spectrum was measured with all channels turned on. The only effect of turning on the additional channels was to lower the Rayleigh backscattering.

FIG. 14 shows the 1554.8 nm and 1556.6 nm demultiplexer channels. The only interference to the 1554.8 nm channel was the –33 dB leakage of the 1556.4 nm channel.

Bit error rates were compared for unidirectional and bidirectional transmission. Significant degradation occurred for 4-channel unidirectional transmission. The lowest obtainable receiver sensitivity penalty was 1.6 dB. (Degradation depended on relative channel polarizations.) In contrast, no degradation was observed for the 1554.8 nm channel measured.

What is claimed is:

1. Optical fiber communications system for operation at a system wavelength, the system including at least two transmission lines, each line including a transmitter, a receiver and a span of fiber, in which the span includes at least one optical amplifier which compensates for a substantial part of fiber loss in the span, the system providing for simultaneous operation of a set of at least four channels of channel wavelength values which together encompass the system wavelength, in which channel-to-channel wavelength spacing is $\leq 5$ nm,

CHARACTERIZED IN THAT each of the two lines transmits a set of channels bidirectionally, the set including two channels in a first transmission direction and two channels in the second transmission direction, and in which an optical amplifier simultaneously amplifies the entire set of channels.

2. System of claim 1 providing for such a set of at least four channels on each of the said fibers, in which the length of the span is at least 90 km, in which digital signals are transmitted, and in which the system provides for a per-channel modulation rate of at least 2.5 Gb/sec.

3. System of claim 1 in which an optical amplifier in the span is a fiber amplifier.

4. System of claim 3 in which the optical amplifier is an erbium-doped fiber amplifier.

5. System of claim 4 in which the at least one system fiber transmits a set of more than four channels.

6. System of claim 5 in which the set includes at least eight channels, four channels in a first transmission direction, and four channels in the second transmission direction.

7. System of claim 1 in which the chromatic dispersion of the fiber in the span is less than 1.5 ps/nm-km at the system wavelength.

8. System of claim 7 in which the fiber is dispersion-shifted fiber.

9. System of claim 1 with add/drop apparatus, such apparatus providing for add/drop of at least one channel in each of the first and second transmission directions.

10. System of claim 9 including at least one additional channel dedicated to optical time division reflectometry (OTDR) for fault location.

11. System of claim 10 including means for signaling substitution of the span responsive to an OTDR-detected fault.

12. System of claim 1 in which the nominal system wavelength is 1550 nm.

13. System of claim 12 in which the system provides for transmission of a second set of channels having a second system wavelength.

14. System of claim 1 in which the nominal system wavelength is 1310 nm.

15. System of claim 1 in which channels of the set are interleaved so that channel transmission direction changes at least twice in the ascending order of channel wavelengths.

16. Communication method using an optically amplified communication system, the system including at least two transmission lines, each line including a span of optical fiber having a chromatic dispersion less than 1.5 ps/nm-km at the system wavelength, the method including simultaneously transmitting at least four WDM channels in each line, the channels having channel-to-channel wavelengths together encompassed within the spectral range of an optical amplifier in the span,

CHARACTERIZED IN THAT the method comprises transmitting bidirectionally in each of the two lines with a pair of channels in a first transmission direction and a pair of channels in the second transmission direction.

17. Method of claim 16 in which transmission is digital with a per-channel bit rate of at least 2.5 Gb/sec for each of the channels in each pair.

18. Method of claim 17 in which channels are interleaved in the single fiber, so that the ascending order of channel wavelengths changes in transmission direction at least twice.

19. Method of claim 16 in which the fiber is dispersion-shifted fiber.

* * * * *